United States Patent [19]
Wallace et al.

[11] Patent Number: 5,964,815
[45] Date of Patent: Oct. 12, 1999

[54] OCCUPANT RESTRAINT SYSTEM HAVING SERIALLY CONNECTED DEVICES, A METHOD FOR PROVIDING THE RESTRAINT SYSTEM AND A METHOD FOR USING THE RESTRAINT SYSTEM

[75] Inventors: Jon Kelly Wallace, Redford; Russell Lynch, West Bloomfield; Scott Kolassa, Farmington Hills, all of Mich.

[73] Assignee: TRW Inc., Lyndhurst, Ohio

[21] Appl. No.: 08/955,470

[22] Filed: Oct. 21, 1997

[51] Int. Cl.$^6$ .................................................. B60R 21/32
[52] U.S. Cl. .......................... 701/45; 307/10.1; 280/735; 180/282
[58] Field of Search .................................. 701/45, 46, 47, 701/48, 49; 280/728.1, 730.1, 734, 735; 180/274, 282; 340/438; 307/10.1

[56] References Cited

U.S. PATENT DOCUMENTS

| | | |
|---|---|---|
| 3,768,409 | 10/1973 | Menz et al. . |
| 4,324,182 | 4/1982 | Kirby et al. . |
| 4,496,010 | 1/1985 | Chapman, III . |
| 4,527,636 | 7/1985 | Bordon . |
| 4,674,047 | 6/1987 | Tyler et al. . |
| 4,689,786 | 8/1987 | Sidhu et al. . |
| 4,760,791 | 8/1988 | Bock . |
| 4,819,560 | 4/1989 | Patz et al. . |
| 4,843,964 | 7/1989 | Bickes, Jr. et al. . |
| 4,986,183 | 1/1991 | Jacob et al. . |
| 5,069,129 | 12/1991 | Kunitomo . |
| 5,291,680 | 3/1994 | Schabdach et al. . |
| 5,446,442 | 8/1995 | Swart et al. . |
| 5,712,784 | 1/1998 | Fendt et al. ................................ 701/45 |
| 5,825,098 | 10/1998 | Darby et al. ................................ 701/45 |
| 5,835,873 | 11/1998 | Darby et al. ................................ 701/45 |
| 5,859,593 | 1/1999 | Takemura et al. ......................... 701/49 |

OTHER PUBLICATIONS

A SAE publication entitled "Bus System for Wiring Actuators of Restraint Systems", by Bauer et al., and believed to have been published in 1996.

*Primary Examiner*—Gary Chin
*Attorney, Agent, or Firm*—Tarolli, Sundheim, Covell, Tummino & Szabo

[57] ABSTRACT

An occupant restraint system (10) for a vehicle (22) has a plurality of controllable occupant restraint system devices (12). The plurality of devices (12) includes sensor devices (e.g., 12E) and/or occupant restraint devices (e.g., 12A). Each restraint system device (12) has programmable control circuitry (18) for permitting control of the respective restraint system device by a central controller (38). A control interconnection (44) connects the central controller (38) and the restraint system devices (12). Electronic switches (54) are connected in series along a line (46A) of the control interconnection (44). Each of the switches (54) is associated with one restraint system device (12). Each of the switches (54) regulates communication between the central controller (38) and any device(s) (12) (e.g., devices 2-N) downstream of the associated device (e.g., device 1). The control circuitry (18) causes the associated switch (54) to "close" and permit communication between the central controller (38) and the device(s) (e.g., device 12-N), if any, downstream of the one restraint system device. The permitted communication is in response to the central controller (38) programming the control circuitry (18) of the one restraint system device. Methods for providing and using the vehicle occupant restraint system (10) are also provided.

14 Claims, 3 Drawing Sheets

OCCUPANT RESTRAINT SYSTEM HAVING SERIALLY CONNECTED DEVICES, A METHOD FOR PROVIDING THE RESTRAINT SYSTEM AND A METHOD FOR USING THE RESTRAINT SYSTEM

TECHNICAL FIELD

The present invention is generally directed to an occupant restraint system, having a central controller that communicates with a plurality of restraint system devices, and associated methods of providing and using the restraint system. The present invention is particularly directed to a system in which the restraint system devices are connected in a daisy chain arrangement.

BACKGROUND OF THE INVENTION

An occupant restraint system includes one or more sensor devices for sensing vehicle characteristics and/or occupant characteristics. The sensed characteristics are used to determine whether a vehicle occupant is to be restrained and/or a deployment profile for restraining the occupant. Examples of such sensor devices include a vehicle acceleration sensor, an occupant position sensor, and an occupant weight sensor. The restraint system also includes one or more actuatable restraint devices for restraining the occupant. Examples of such restraint devices include an air bag module, a knee bolster, and a seat belt pretensioner.

As the sophistication of occupant restraint systems has increased, the number and complexity of the sensor and restraint devices in a single vehicle has increased. In response to the increased number and complexity of devices, there has been a movement toward centralized control of the devices to reduce cost and to increase reliability of the overall restraint system.

Also, sometimes there is a need to replace one of the restraint system devices. For example, after deployment of an individual restraint device, the deployed restraint device must be replaced. Also, if a sensor device becomes inoperative, it must be replaced. The replacement device must be properly connected into the overall restraint system.

The changes in design approach and the need for ease in replacement for such restraint systems has brought about a need to design new arrangements for interconnecting individual devices to a central controller.

SUMMARY OF THE INVENTION

In accordance with one aspect, the present invention provides an occupant restraint system for a vehicle. A plurality of controllable restraint system devices is provided within the restraint system. Each of the restraint system devices has programmable means, which is programmable, for permitting control of the respective restraint system device. Central control means of the system provides programming signals and control signals for the restraint system devices. A connection line connects the central control means and the restraint system devices. The connection line is for communication between the central control means and the restraint system devices.

The system includes a plurality of communication regulation means. The communication regulation means are connected in series along the connection line. Each of the communication regulation means is associated with one of the restraint system devices. Each of the communication regulation means regulates communication between the central control means and any restraint system device(s) downstream of the associated restraint system device along the connection line from the central control means.

The system includes a plurality of enable means. Each of the enable means is associated with one of the restraint system devices. Each enable means causes the communication regulation means associated with the one restraint system device to permit communication between the central control means and the any restraint system device(s) downstream of the one restraint system device. The permission of communication is in response to the central control means providing a programming signal to the one restraint system device, via the connection line.

In accordance with another aspect, the present invention includes a method for providing a vehicle occupant restraint system for a vehicle. A plurality of controllable restraint system devices is provided. Each of the restraint system devices has programmable means, which is programmable, to permit control of the respective restraint system device. A central control means is provided. The central control means provides programming signals and control signals for the restraint system devices. A connection line is connected to the central control means and the restraint system devices. The connection line is for communication between the central control means and the restraint system devices.

A plurality of communication regulation means is connected in series along the connection line. Each of the communication regulation means is associated with one of the restraint system devices. Each communication regulation means regulates communication along the connection line between the central control means and any restraint system device(s) downstream of the associated restraint system device from the central control means. A plurality of enable means is provided. Each of the enable means is associated with one of the restraint system devices. Each of the enable means cause the communication regulation means associated with the one restraint system device to permit communication between the central control means and any restraint system device(s) downstream of the one restraint system device. The permission of communication is in response to the central control means providing a programming signal to the one restraint system device, via the connection line.

In accordance with yet another aspect, the present invention includes a method of configuring and controlling an occupant restraint system for a vehicle. The system has a plurality of controllable restraint system devices. Each of the restraint system devices has a programmable means for permitting control of the respective restraint system device. The system includes central control means, which provides programming signals and control signals for the restraint system devices. The system includes a connection line connecting the central control means and the restraint system devices.

A plurality of communication regulation means is connected in series along the connection line. Each of the communication regulation means is associated with a respective restraint system device. Communication is regulated at one of the communication regulation means. The regulated communication is between the central control means and any restraint system device(s) downstream of the restraint system device associated with the one communication regulation means along the connection line from the central control means. The regulation is such that the communication between the central controller and the any restraint system device(s) downstream of the associated restraint system device is permitted after the central control means provides a programming signal to the one restraint system device, via the connection line.

BRIEF DESCRIPTION OF THE DRAWINGS

The foregoing and other features and advantages of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
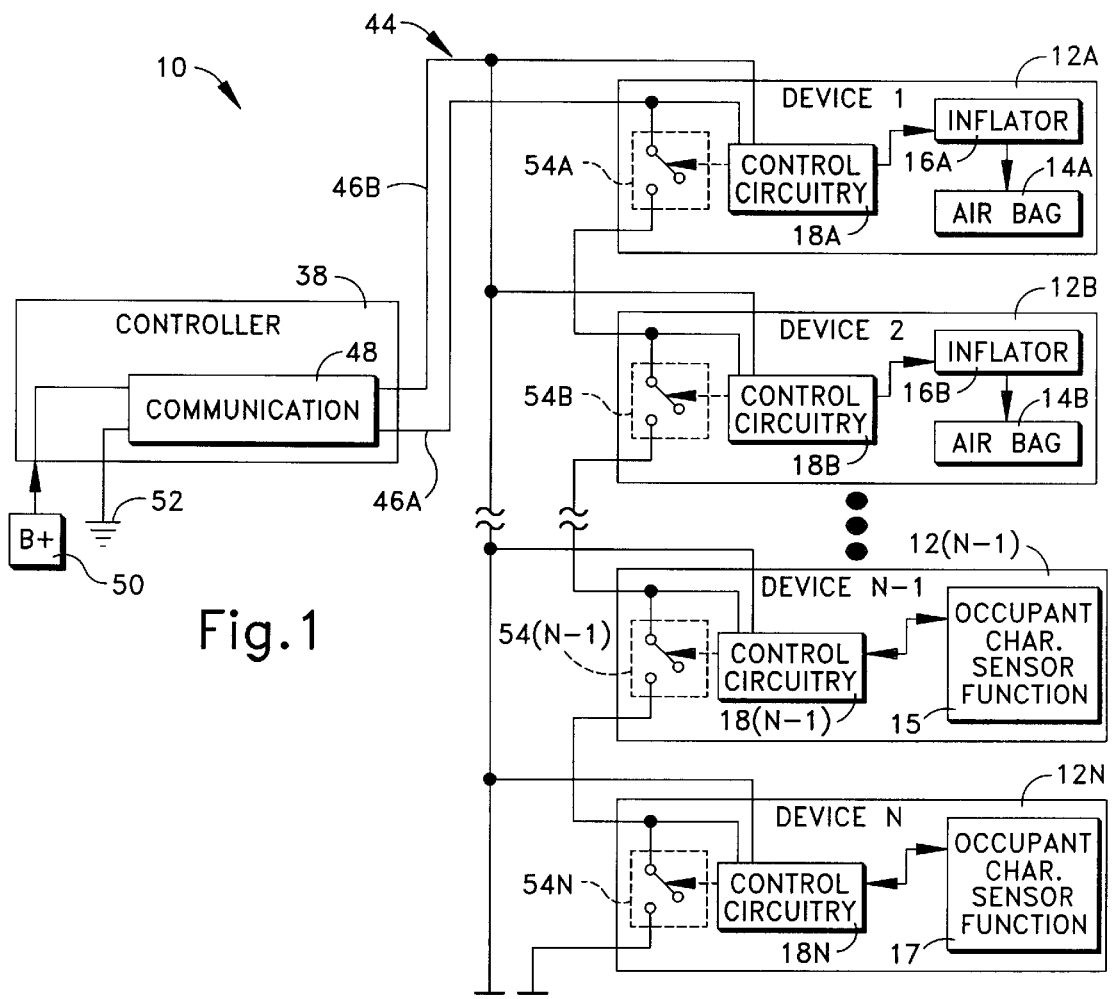
FIG. 1 is a schematic illustration of an apparatus in accordance with the present invention.

A representation of the present invention is schematically shown in FIG. 1 as an occupant restraint system 10. The system 10 includes a plurality of restraint system devices 12. The restraint system devices 12 may be comprised of any combination of devices. For example, some of the restraint system devices 12 may be actuatable occupant restraint devices (e.g., devices 1 and 2 of FIG. 1) for restraining a vehicle occupant. Examples of such occupant restraint devices include an air bag device, a knee bolster, a seat belt lock, a seat belt pretensioner, and a D-ring adjuster. For the purpose of illustration of the invention and not for the purpose of limitation, the example shown in FIG. 1 has occupant restraint devices 12A and 12B, which are air bag restraint devices.

Each restraint device 12A and 12B includes an associated inflatable restraint 14, commonly referred to as an air bag. The air bag 14 is stored in a folded condition within the device 12 in a manner well known in the art. A source 16 of inflation fluid (e.g., nitrogen gas) is provided to inflate the air bag 14. The source 16 of inflation fluid is commonly referred to as an inflator, and includes a stored quantity of pressurized inflation fluid and/or an inflation fluid generating material. The inflator 16 has an associated initiator (e.g., a pyrotechnic squib), which is electrically activated to initiate flow of the inflation fluid from the inflator. The flow of inflation fluid to the air bag 14 inflates the air bag, as will be appreciated by a person of ordinary skill in the art.

Further, the example of FIG. 1 contains two restraint system devices 12(N-1) and 12N that are sensor devices. Each sensor device senses a characteristic that is used to determine whether a vehicle occupant is to be restrained and/or deployment profile for restraining the occupant. Examples of sensor devices include a vehicle crash sensor, such as an accelerometer, an occupant position sensor, such as an ultrasound and infrared sensor, and an occupant weight sensor, such as a pressure sensor. For the purpose of illustration only and not for the purpose of limitation, the sensor device 12(N-1) of FIG. 1 is an occupant characteristic sensor (e.g., an ultrasound sensor) with an occupant characteristic sensor function 15, and the sensor device 12N of FIG. 1 is a vehicle characteristic sensor (e.g., an accelerometer) with a vehicle characteristic sensor function 17.

Hereinafter, all of the devices (i.e., the restraint devices and the sensor devices) are referred to collectively as restraint system devices for discussions which are applicable to any or all of the devices in the restraint system 10. Also, it should be appreciated that the restraint system devices 12A–12N of the illustrated example have elements which are identified by numbers with corresponding alphabetic suffixes. Herein, the alphabetic suffixes are sometimes omitted for generic discussions, i.e., applicable to all of the restraint system devices.

Any number (e.g., N) of restraint system devices 12 may be provided within the restraint system 10. An example of a restraint system having four restraint devices and two sensor devices is shown within a vehicle 22 in FIG. 2. In the illustrated example, a first occupant restraint device 12A is a vehicle side-impact air bag restraint device mounted in a driver's side door 24. Upon inflation of the air bag 14A of the driver's side door mounted restraint device 12A, the air bag 14A extends at a side of a driver's seat 26 of the vehicle. A second one of the devices is a hub-mounted restraint device 12B located within a hub of the vehicle's steering wheel 28. Upon inflation of the air bag 14B of the hub-mounted restraint device 12B, the air bag 14B inflates at a location in front of the driver's seat 26, with respect to the fore-to-aft axis of the vehicle 22.

A third one of the restraint devices (i.e., 12C) is mounted in a passenger side of an instrument panel 30 of the vehicle 22. The air bag 14C of the instrument panel-mounted restraint device 12C inflates at a location in front of a front passenger seat 32 of the vehicle 22. A fourth one of the restraint devices is a door mounted restraint device 12D located in a passenger door 34 of the vehicle 22. The air bag 14D of the door-mounted restraint device 12D inflates at a location to the side of the passenger seat 32. A first one 12E of the two sensor devices is an ultrasound sensor (e.g., an ultrasonic transducer 20 and associated drive/monitor circuitry) for sensing the presence and position of a front seat passenger. The second sensor device 12F is an accelerometer for sensing vehicle acceleration in the fore-to-aft direction. It will be appreciated that additional and/or different actuatable occupant restraint devices and that additional and/or different sensor devices can be included within the restraint system 10.

Referring now again to FIG. 1, each restraint system device 12 includes control circuitry 18, which controls the respective device. For example, with regard to the restraint devices 12A and 12B, the control circuitry controls actuation of the inflator 16. It should be noted that although the various restraint system devices 12 may be different, each has similar control circuitry for controlling communication. The control circuitry 18 contains logic and memory circuitry, and is addressable/programmable. The control circuitry 18 is connected to communicate in a network within the restraint system 10. The addressable aspect of the control circuitry 18 is provided such that the restraint system device 12 "knows" when a communication is directed to that particular device.

The restraint system 10 includes a central controller 38 (FIG. 1). In one example, the central controller 38 includes a microcomputer. The central controller 38 receives sensory input from the sensor devices (e.g., 12(N-1) 12N), and using the sensory input regarding the sensed characteristics, makes determination regarding restraint module control (e.g., the central controller operates a crash algorithm). Also, a person of ordinary skill in the art will appreciate that the restraint devices (e.g., 12A, 12B) could have adjustable aspects that are adjustable to tailor deployment of the respective restraint device. Information derived from such sensed characteristic(s) would be used by the controller 38 to determine adjustment of the deployment variable(s). Such adjustable deployment variables include timing, air bag dynamic profile, pressure, etc. The controller 38 would control the adjustment of the deployment variable(s) accordingly.

The central controller 38 analyzes the information derived from the sensed characteristics and determines if a deployment crash condition is occurring. A deployment crash condition is one in which deployment of one or more air bag(s) 14 is desired to hopefully, in combination with the vehicle seat belts (not shown) or other actuatable restraints, enhance the restraint finction of the occupant restraint system 10. Also, any adjustment of the deployment profiles is accomplished. Thus, in accordance with the present invention, the restraint system 10 is configured such that the central controller 38 appropriately actuates the plurality of restraint system devices 12.

Figure 2:
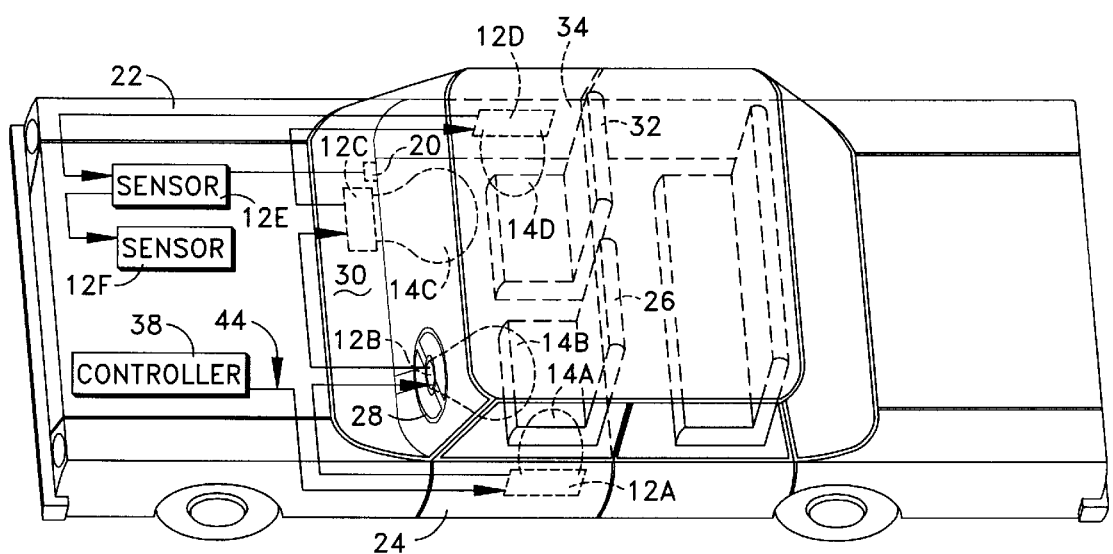
FIG. 2 is a schematic illustration of a vehicle, which includes an example of the present invention.

To permit this communication/control, the central controller 38 is connected to the plurality of restraint system devices 12 via a control interconnection 44. In accordance with the present invention and as schematically represented in FIG. 2, the control interconnection 44, between the central controller 38 and the restraint system devices 12, has at least one connection that is a serial or "daisy-chain" connection along the restraint system devices. In the preferred embodiment, two connection lines 46A, 46B (FIG. 1) provide the control interconnection 44 between the central controller 38 and the restraint system devices 12.

The central controller 38 includes a communication portion 48 connected to the two connection lines 46A, 46B. The communication portion 48 outputs communication signals, from the central controller 38 to the restraint system devices 12, via the connection lines 46A, 46B. The communication portion 48 also receives communication signals from the restraint system devices 12, via the connection lines 46A, 46B.

The central controller 38 is connected to both the vehicle power source 50 (i.e., the vehicle battery) and to vehicle ground 52. In one preferred embodiment, the central controller 38, via the communication portion 48, also provides electrical power for the plurality of restraint system devices 12, via the connection lines 46A, 46B. Any known method of providing electrical power and communication signals over the same electrical interconnection(s), can be employed within the system. Thus, the known methods of electrical power and communication signal provision are not discussed in detail herein.

Focusing now on the two connection lines 46A and 46B of the control interconnection 44, one of the connection lines connects the central controller 38 to each of the restraint system devices 12 in parallel. In the illustrated example of FIG. 1, the parallel-connection is provided by the line 46B. The other connection line 46A connects the central controller 38 to the restraint system devices 12 in series (i.e., the daisy chain connection). Within each of the restraint system devices 12, the connection lines 46A, 46B are connected to the control circuitry 18 of the respective device. Thus, the central controller 38 can communication with, and can supply power to, the control circuitry 18 of the respective device 12.

Associated with each restraint system device 12 is an electronic switch 54. Each electronic switch 54 has an "ON" or "closed" state, and an "OFF" or "open" state. In its "ON" state, each switch 54 permits electrical signals to flow through the switch, and in the "OFF" state, the switch blocks/interrupts flow of the electrical signals. In the illustrated embodiment of FIG. 1, the electronic switch 54 for each restraint system device 12 is shown within the respective device. A person of ordinary skill in the art should appreciate that the electronic switch 54 can be a separate element from the respective restraint system device 12, and yet be associated with the restraint system device.

The electronic switches 54 are connected in series, along one of the connection lines 46A, 46B. In FIG. 1, the switches 54 are in series along the connection line 46A. The electronic switch 54 associated with a particular restraint system device 12 is interposed between the central controller 38 and all of the restraint system devices 12, if any, which are "downstream" of the particular restraint system device. The restraint system devices 12 are, therefore electrically "daisy-chained". It should be noted that although, the illustrated examples have their sensor devices located at a "far" end of the daisy-chain from the controller 38, other connection orders are possible.

Communication between the central controller 38 and a respective one of the restraint system devices 12 is possible only if a completed connection (i.e., non-interrupted) between the central controller and that respective restraint system device is present within the control interconnection 44. Specifically, communication is possible between a "downstream" restraint system device only if all, if any present, of the "upstream" electronic switches 54 are closed. Thus, each of the restraint system devices 12, via their associated electronic switch 54, controls communication between the central controller 38 and all, if any, "downstream" restraint system devices in the daisy chain. It should be appreciated that the nomenclature "downstream" is with reference to a direction away from the central controller 38, and proceeding through the first restraint system device 12A (device 1, in FIG. 1) in the daisy chain toward last restraint system device 12N (device N, in FIG. 1) in the daisy chain.

Each of the electronic switches 54 is in its "OFF" state until its associated restraint system device 12 is programmed. Programming of each of the restraint system devices 12 includes establishing an unique address for each device 12. Programming may also include initialization of the restraint system device 12 (e.g., setting of initial states within the restraint system device). Programming by the central controller 38 allows the programmed restraint system device 12 to engage in operational communication with the central controller. Specifically, once addressed, the inflator 16 is controllable either by the controller 38, or by its associated control circuit 18 in response to data received from controller 38.

Initial assembly of the system 10 shown in FIG. 1 requires an initial programming of addresses for the restraint system devices 12. Also whenever a module is replaced, the new module must be programmed with the address of the module that it replaced. The establishment of these module addresses is referred to as a programming sequence. Once programmed by the central controller 38 during the programming sequence, the control circuitry 18 of the respective device 12 causes its associated electronic switch 54 to "close" (i.e., turn "ON").

The restraint system 10 of the present invention permits the restraint system devices 12 to be quickly and easily assembled into the system, and permits quick and easy removal and replacement of the restraint system devices (e.g., replacement of a restraint device after deployment). Further, communication between the central controller 38 and the restraint system devices 12 is readily established both initially or when a particular restraint system device 12 is replaced. For example, assume for the purpose of illustration, that the restraint system 10 is newly assembled, or that at least one of the restraint system devices 12 is being replaced. All of the electronic switches 54 either are set or are reset to an initial "open" state or condition by any suitable means for accomplishing the task (e.g., a default or reset command).

To begin a programming sequence for the restraint system 10, the central controller 38 outputs a polling signal on the control interconnection 44 (e.g., a coded signal on connection line 46A). Because all of the electronic switches 54 are in an "open" state, only the first restraint system device 12A (i.e., device 1 of FIG. 1) receives the polling signal. The first restraint system device 12A (device 1) replies to the central controller 38, and, through a sequence of communications between the central controller and the first restraint system device, the first restraint system device is programmed.

Once the first restraint system device 12A (device 1) is programmed (i.e., an address established), the control circuitry 18 "closes" the electronic switch 54A associated with the first restraint system device 12A. The central controller 38 again outputs a polling signal on the control interconnection 44 (e.g., a signal on line 46A). The first restraint system device 12A, which is now programmed, does not respond to the present polling signal. However, the second restraint system device 12B (i.e., device 2 of FIG. 1) receives the polling signal. The currently un-programmed second restraint system device 12B responds to the central controller 38 and, via a sequence of communication between the controller 38 and the second restraint system device 12B, the central controller 38 programs the second restraint system device. The control circuitry 18 of the, now programmed (i.e., an address established), second restraint system device 12B causes is associated electronic switch 54B to "close".

This process repeats, sequentially through each of the restraint system devices 12 in the daisy chain. For example, the second to last restraint system device 12(N-1) (i.e., device (N-1) of FIG. 1) is programmed (i.e., an address established) and causes its associated electronic switch 54(N-1) to "close" such that the last restraint system device 12N (i.e., device N of FIG. 1) may subsequently be programmed (i.e., an address established). Once the last restraint system device 12N is programmed, the electronic switch 54N of the last restraint system device may be "closed". However, closing this switch 54N has no consequence. The switch 54N associated with the last restraint system device 12N is provided such that additional restraint system devices may be added to the system without rewiring any of the existing devices. Also, the connection lines 46A, 46B are shown as having free ends which are connectable to an added device. The free ends of the connection lines 46A, 46B may be plug-in ports for wires extending from an added device. Such a system provides flexibility regarding its utilization in a vehicle.

Once all of the restraint system devices 12 are programmed (i.e., have addresses established) all of the restraint system devices may communicate with the central controller 38. Communication may be by single bit signals, or by a multi-bit series of signals. The communication between the central controller 38 and the restraint system devices 12 may be governed by any suitable communication scheme. For example, in order to avoid signal "collisions" on the control interconnection 44, a communication protocol may be imposed such that each restraint system device 12 may only communicate at its assigned time.

The central controller 38 may provide a communication signal intended for any one, any combination, or all of the restraint system devices 12. An example of a signal provided to some of the restraint system devices 12 is an "actuate" signal provided to the steering wheel hub-mounted and the instrument panel-mounted restraint system devices 12B and 12C (FIG. 2) when the central controller 38 determines that the vehicle 22 is involved in a head-on collision.

Figure 3:
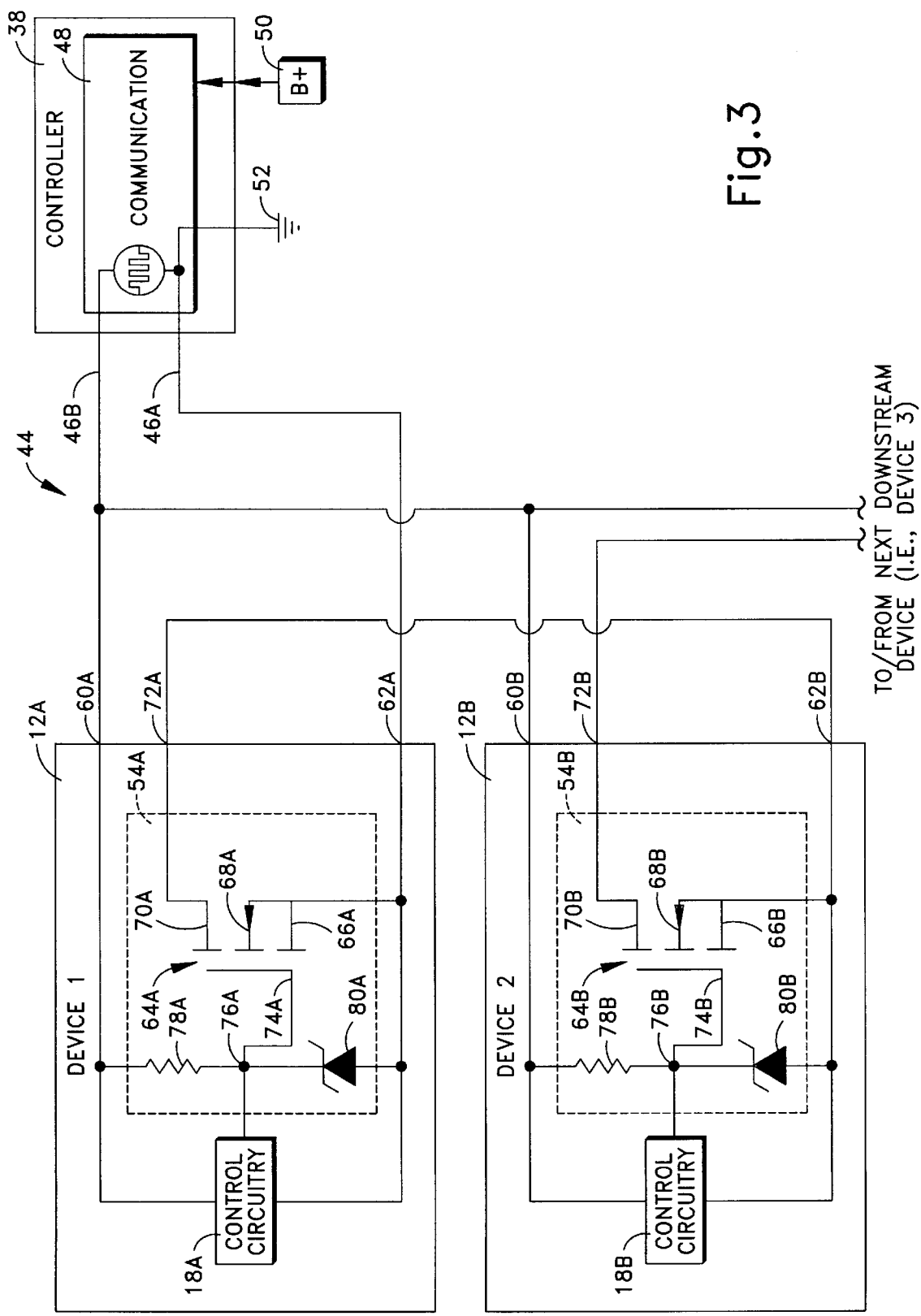
FIG. 3 is a circuit diagram showing details of a portion of a first embodiment of the present invention.

A specific example of the sequential (i.e., daisy chain) control arrangement of the interconnection 44, and the associated electronic switches 54, is shown in FIG. 3. In this example the devices 12A and 12B may be any type of restraint system device (e.g., a sensor device or a restraint device). The connection line 46B is the communication drive line and the connection line 46A is the return line. The connection line 46B connects the central controller 38 to each of the control circuits 18 of the restraint system devices 12 (i.e., the parallel connection). The connection line 46A is daisy-chained between the plurality of restraint system devices 12 (i.e., the series connection). At each restraint system device 12, the connection line 46B is connected to an input port 60 of the restraint system device. The connection line 46A is connected to a return port 62 of the restraint system device 12.

At each restraint system device 12, the electronic switch 54 includes an N-channel MOSFET 64. Focusing on the first restraint system device 12A, the source 66A and substrate 68A of the N-channel MOSFET 64A are connected together and are connected to the return port 62A of the device 12A. The drain 70A of the N-channel MOSFET 64A is connected to a daisy chain port 72A of the restraint system device 12A. A segment of the connection line 46A extends from the daisy chain port 72A of the restraint system device 12A to the return port 62B of the next, downstream restraint system device 12B (i.e., in the direction away from the central controller 38).

Still focusing on the first restraint system device 12A, the gate 74A of the N-channel MOSFET 64A is connected to a control node 76A, which is connected, in turn to the control circuitry 18A of the restraint system device 12A. A resistor 78A couples the control node 76A to the input port 60A. A zener diode 80A is operative between the control node 76A and the return port 62A. The zener diode 80A protects the N-channel MOSFET 64A from damage when the voltage at input port 60A relative to return port 62A exceeds the maximum gate to source voltage of the MOSFET. The control circuitry 18A is connected to the input port 60A and the return port 62A. The second restraint system device 12B has the same structure identified by a suffix "B".

After the central controller 38 has finished programming (i.e., establishing an address) the restraint system device 12A, the control circuitry 18A "closes" the electronic switch 54A by controlling the control node 76A (i.e., the gate 74A of the N-channel MOSFET 64). Specifically, prior to the restraint system device 12A being programmed, the control circuitry 18A biases the MOSFET 64 "OFF". When the MOSFET 64 is "OFF", the return port 62A of the restraint system device 12A is not connected to the daisy chain port 72A of the restraint system device 12A. Once the restraint system device 12A is programmed, the control circuitry 18A biases the MOSFET 64A "ON". This, in effect, "closes" the switch 54A which connects the return port 62A to the daisy chain port 72A. The return port 62B of the next restraint system device 12B (device 2) is connected to the central controller 38 through the electronic switch 54A of the first restraint system device 12A (device 1).

This daisy chain process of programming the respective devices 12 continues until all have been programmed (i.e., given associated addresses). Assume that within the system 10, a restraint system device 12X was to be replaced. Restraint system device 12X can be any one of the devices 12A–12N. Once placed in the daisy chain, the MOSFET 64X of the device 12X would be biased "OFF" since the control circuit 18X of device 12X has not yet been programmed. This would "break" the daisy chain connection, and all, if any, devices downstream of device 12X would be non-responsive to the central controller 38 since their control circuits 18 would lose their ground connection.

Once the new device 12X is connected, controller 38 can detect such occurrence and proceed to send the appropriate signal(s) to program the controller 18X. It should be appreciated that once device 12X is connected in the system 10, its associated control circuit 18X is grounded through the device 18(X-1), if any. Once device 18X is programmed, the control circuit 18X would bias its associated MOSFET 64X "ON" to complete the serially connected daisy chain.

Figure 4:
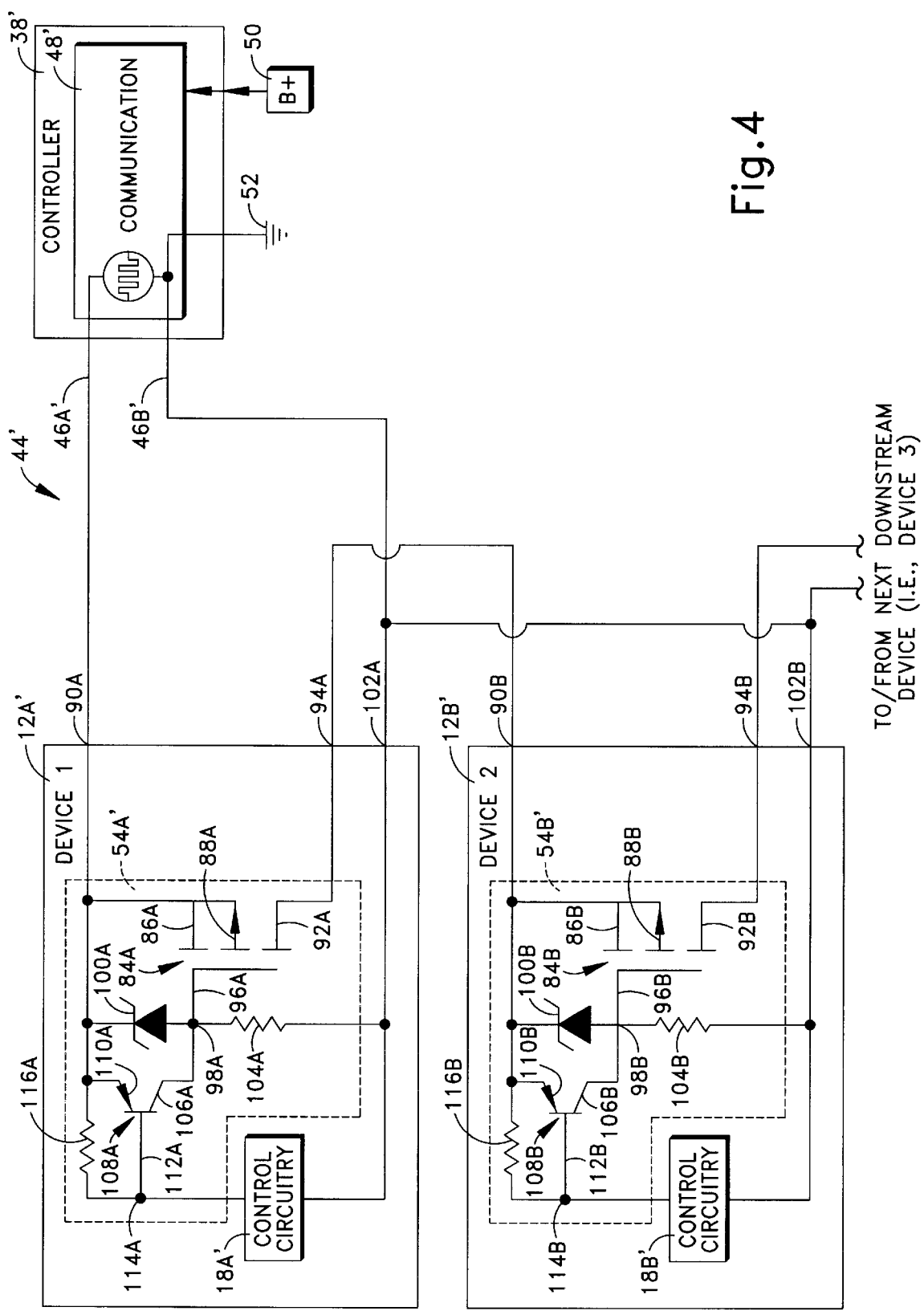
FIG. 4 is a view similar to FIG. 3 and shows details of a second embodiment of the present invention.

FIG. 4 illustrates another embodiment of the present invention using a P-channel MOSFET as the switch 54'. In the embodiment of FIG. 4, a prime (i.e., "'") is added to the alpha-numeric numbers used above to identify components generically above (FIG. 1). The prime (FIG. 4) designates that the identified element of this embodiment has a function similar to its earlier mentioned counterpart, but has a different structure. The use of alphabetic suffixes is the same as its use above.

The connection line 46A' (FIG. 4) is connected to the central controller 38' as the driven connection line and the connection line 46B' is connected to the controller as the return line. The connection line 46A' is daisy-chained among the plurality of restraint system devices 12' and the connection line 46B' is connected to the plurality of restraint system devices in a parallel connection arrangement.

Within the electronic switch 54' at each restraint system device 12', a P-channel MOSFET 84 is provided. The source 86 and substrate 88 of the P-channel MOSFET 84 are connected together and are connected to an input port 90 of the restraint system device 12'. For the first restraint system device 12A' (device 1), the input port 90A is connected to the line 46A' from the central controller 38. The drain 92A of the P-channel MOSFET 84A is connected to a daisy chain port 94A.

The daisy chain port 94A of the first restraint system device 12A' (device 1) is connected to the input port 90B of the second restraint system device 12B' (device 2). Accordingly, the daisy chain along the connection line 46A' is through the P-channel MOSFETs 84.

Focusing again on the first restraint system device 12A', the gate 96A of the P-channel MOSFET 84A is connected to a gate node 98A. Zener diode 100A is operatively connected between the input port 90A and the gate node 98A. The gate node 98A is connected to a return port 102A, via a resistor 104A. The gate node 98A is also connected to a collector 106A of a PNP transistor 108A. The emitter 110A of the PNP transistor 108A is connected to the input port 90A, and the base 112A of the PNP transistor is connected to a control node 114A. The control node 114A is connected to the control circuitry 18A' and is also connected to the input port 90A, through a resistor 116A. Accordingly, the resistor 116A is connected between the emitter 110A and base 112A of the PNP transistor 108A. Further, the control node 114A serves as both the control node for the electronic switch 54A' and the input node for the control circuitry 18A'. The second restraint system device 12B' has the same structure identified by a suffix "B".

When a restraint system device 12' is in an unprogrammed state, the control circuitry 18' biases the control node 114 so as to, in turn, bias the P-channel MOSFET 84 "OFF". Once the restraint system device 12' is programmed, the control circuitry 18' biases the control node 114 so as to maintain the P-channel MOSFET 84 "ON". Thus, the input port 90 is connected to the daisy chain port 94. The input port 90 of the next restraint system device is, thus, connected to the central controller 38 through the upstream P-channel MOSFET 84. Programming of all devices 12' is completed initially through the series daisy chain. A replacement devices 12X' would initially break the daisy chain until it is programmed with an address which, in turn, results in its associated switch 54' to close.

From the above description of the invention, those skilled in the art will perceive improvements, changes and modifications. For example, programming of devices 12 is described above as the establishment of a device address. Those skilled in the art should appreciate that other programming function can be programmed into a device 12 particularly in a system in which the control circuitry 18 includes a microcomputer. Such improvements, changes and modifications within the skill the of the art are intended to be covered by the appended claims.

Having described the invention, we claim:

1. An occupant restraint system for a vehicle, said system comprising:

a plurality of controllable occupant restraint system devices, each of said restraint system devices having programmable means, which is programmable, for permitting control of the respective restraint system device;

central control means for providing programming signals and control signals for receipt by said restraint system devices;

a connection line, connecting said central control means and said restraint system devices, for providing communication between said central control means and said restraint system devices;

a plurality of communication regulation means, connected in series along said connection line, each of said communication regulation means being associated with one of said restraint system devices and for regulating communication between said central control means and any restraint system devices down-stream of said associated restraint system device along said connection line; and a plurality of enable means, each of said enable means being associated with one of said restraint system devices and for causing said communication regulation means associated with the one restraint system device to permit communication between said central control means and said any restraint system devices downstream of said one restraint system device in response to said central control means providing a programming signal to said one restraint system device via said connection line.

2. An occupant restraint system as set forth in claim 1, wherein said plurality of restraint system devices includes at least one sensor device for sensing a characteristic used for determining vehicle occupant restraint.

3. An occupant restraint system as set forth in claim 1, wherein said plurality of restraint system devices includes at least one restraint device for restraining a vehicle occupant.

4. An occupant restraint system as set forth in claim 1, wherein said central control means includes means for providing each of said programming signals in series over said connection line.

5. An occupant restraint system -as set forth in claim 1, wherein said central control means including means for providing polling signals to determine the position of each restraint system device along said connection line.

6. An occupant restraint system as set forth in claim 1, wherein each restraint system device has an address provided by said control means via the programming signal from said central control means to that restraint system device, said central control means being able to communicate with any restraint system device which has been provided with an address.

7. A method for providing a vehicle occupant restraint system for a vehicle, said method comprising:

providing a plurality of controllable occupant restraint system devices, each of the restraint system devices having programmable means, which is programmable, to permit control of the respective restraint system device;

providing central control means, the central control means provides programming signals and control signals for receipt by the restraint system devices;

connecting a connection line to the central control means and the restraint system devices for providing communication between the central control means and the restraint system devices;

connecting a plurality of communication regulation means in series along the connection line, each of the communication regulating means being associated with one of the restraint system devices and regulating communication along the connection line between the central control means and any restraint system devices down-stream of the associated restraint system device;

providing a plurality of enable means, each of the enable means being associated with one of the restraint system devices, and each of which cause the communication regulation means associated with the one restraint system device to permit communication between the central control means and any restraint system devices down-stream of the one restraint system device in response to the central control means providing a programming signal to the one restraint system device via the connection line.

8. A method of configuring and controlling an occupant restraint system for a vehicle, the system having a plurality of controllable occupant restraint system devices, which each have programmable means for permitting control of the respective restraint system device, central control means for providing programming signals and control signals for receipt by the restraint system devices, and a connection line connecting the central control means and the restraint system devices, said method comprising:

connecting a plurality of communication regulation means in series along the connection line, each of the communication regulation means being associated with a respective restraint system device; and regulating communication at one of the communication regulation means, the regulated communication being between the central control means and any restraint system devices down-stream of the restraint system device associated with the one communication regulation means along the connection line from the central control means, and the regulation being such that the communication between the central control means and the any restraint system devices down-stream of the associated restraint system device is permitted after the central control means provides a programming signal to the associated restraint system device via the connection line.

9. A method as set forth in claim 8, wherein each programming signal provided by the central control means is intended for only one of the restraint system devices, each control signal provided by the central control means is intended for one or more of the restraint system devices.

10. An occupant restraint system for a vehicle, said system comprising:

a plurality of controllable occupant restraint system devices, each of said restraint system devices having programmable means, which is programmable, for permitting control of the respective restraint system device;

central control means for providing programming signals and control signals for receipt by said restraint system devices;

a connection line, connecting said central control means and said restraint system devices, for providing communication between said central control means and said restraint system devices;

a plurality of communication regulation means, connected in series along said connection line, each of said communication regulation means being associated with one of said restraint system devices and for regulating communication between said central control means and any restraint system devices down-stream of said associated restraint system device along said connection line; and a plurality of enable means, each of said enable means being associated with one of said restraint system devices and for causing said communication regulation means associated with the one restraint system device to permit communication between said central control means and said any restraint system devices down-stream of said one restraint system device in response to said central control means providing a programming signal to said one restraint system device via said connection line;

each of said communication regulation means including an electronic switch having a closed state for permitting communication between said central control means and said any restraint system devices downstream of said associated restraint system device and an open state for preventing communication between said central control means and said any restraint system devices down-stream of said associated restraint system device, said electronic switch of each communication regulation means including an N-channel MOSFET having its source and drain connected in said connection line, and wherein said MOSFET of each electronic switch has its gate connected to an associated one of said enable means.

11. An occupant restraint system as set forth in claim 10, wherein for each associated group of restraint system device, communication regulation means and enable means, said enable means is part of a control circuitry associated with said restraint system device, said programmable means of said restraint system device is another part of said associated control circuitry, said control circuitry biases said gate of said MOSFET of said communication regulation means to change said MOSFET from its open state to its closed state when said control circuitry is programmed.

12. An occupant restraint system for a vehicle, said system comprising:

a plurality of controllable occupant restraint system devices, each of said restraint system devices having programmable means, which is programmable, for permitting control of the respective restraint system device;

central control means for providing programming signals and control signals for receipt by said restraint system devices;

a connection line, connecting said central control means and said restraint system devices, for providing communication between said central control means and said restraint system devices;

a plurality of communication regulation means, connected in series along said connection line, each of said communication regulation means being associated with one of said restraint system devices and for regulating communication between said central control means and any restraint system devices down-stream of said associated restraint system device along said connection line; and a plurality of enable means, each of said enable means being associated with one of said restraint system devices and for causing said communication regulation means associated with the one restraint system device to permit communication between said central control means and said any restraint system devices downstream of said one restraint system device in response to said central control means providing a programming signal to said one restraint system device via said connection line;

each of said communication regulation means including an electronic switch having a closed state for permitting communication between said central control means and said any restraint system devices downstream of said associated restraint system device and an open state for preventing communication between said central control means and said any restraint system devices downstream of said associated restraint system device, said electronic switch of each communication regulation means including a P-channel MOSFET having its source and drain connected in series with said connection line, said electronic switch also including a PNP transistor having its emitter and collector connected between said connection line and a gate of said MOSFET, said PNP transistor having its base connected to said associated enable means.

13. An occupant restraint system as set forth in claim 12, wherein for each associated group of restraint system device, communication regulation means and enable means, said enable means is part of a control circuitry associated with said restraint system device, said programmable means of said restraint system device is another part of said associated control circuitry, said control circuitry biases said base of said PNP transistor to cause said MOSFET to change from its open state to its closed state when said control circuitry is programmed.

14. An occupant restraint system for a vehicle, said system comprising:

a plurality of controllable occupant restraint system devices, each of said restraint system devices having programmable means, which is programmable, for permitting control of the respective restraint system device;

central control means for providing programming signals and control signals for receipt by said restraint system devices;

a connection line, connecting said central control means and said restraint system devices, for providing communication between said central control means and said restraint system devices;

a plurality of communication regulation means, connected in series along said connection line, each of said communication regulation means being associated with one of said restraint system devices and for regulating communication between said central control means and any restraint system devices down-stream of said associated restraint system device along said connection line; and a plurality of enable means, each of said enable means being associated with one of said restraint system devices and for causing said communication regulation means associated with the one restraint system device to permit communication between said central control means and said any restraint system devices downstream of said one restraint system device in response to said central control means providing a programming signal to said one restraint system device via said connection line;

each of said communication regulation means including an electronic switch having a closed state for permitting communication between said central control means and said any restraint system devices downstream of said associated restraint system device and an open state for preventing communication between said central control means and said any restraint system devices downstream of said associated restraint system device.

* * * * *